United States Patent Office 3,085,932
Patented Apr. 16, 1963

3,085,932
THERAPEUTIC COMPOSITION COMPRISING 3,3-DIETHYL - 5 - METHYL - 2,4 - PIPERIDINEDIONE AND 7-CHLORO-2-METHYLAMINO-5-PHENYL-3H-1,4-BENZODIAZEPINE-4-OXIDE
Saul Howard Rubin, Nutley, and Gerhard Zbinden, Essex Fells, N.J., assignors to Hoffmann-La Roche Inc., Nutley, N.J., a corporation of New Jersey
No Drawing. Filed Dec. 21, 1961, Ser. No. 161,270
7 Claims. (Cl. 167—52)

This invention relates to novel therapeutic compositions. More particularly, the invention relates to therapeutic compositions comprising a mixture of 3,3-diethyl-5-methyl-2,4-piperidinedione with 7-chloro-2-methylamino-5-phenyl-3H-1,4-benzodiazepine 4-oxide or one of its medicinally acceptable acid addition salts.

The compositions of the present invention have been found to be useful in the inducement of sound sleep. They are especially well suited for use, however, in the treatment of patients with sleep problems associated with anxiety, tension or other common emotional disturbances. These compositions, therefore, fill a long existing need in the treatment of patients with heart disease or other chronic ailments, in the treatment of neuropsychiatric patients and in the treatment of patients in pre- and post-operative states.

3,3-diethyl-5-methyl-2,4-piperidinedione is a non-narcotic, sedative-hypnotic which possesses high therapeutic activity and, at the same time, manifests low toxicity. It has been found that 7-chloro-2-methylamino-5-phenyl-3H-1,4-benzodiazepine 4-oxide, and medicinally acceptable salts thereof, compounds which, in therapeutic doses, do not have hypnotic properties, cause sleep potentiation of 3,3-diethyl-5-methyl-2,4-piperidinedione.

Moreover, in some animal species, particularly in the dog, administration of 3,3-diethyl-5-methyl-2,4-piperidinedione appears to induce an initial phase of excitation which phase is followed by a sedation phase and a hypnotic phase. It has been found that 7-chloro-2-methylamino-5-phenyl-3H-1,4-benzodiazepine 4-oxide does not potentiate the excitation phase induced by 3,3-diethyl-5-methyl-2,4-piperidinedione. On the contrary, it appears to suppress this initial excitation. Such effect, while highly advantageous, was entirely unexpected.

Thus, the present invention comprises therapeutically active compositions comprising a mixture of 3,3-diethyl-5-methyl-2,4-piperidinedione with 7-chloro-2-methylamino-5-phenyl-3H-1,4-benzodiazepine 4-oxide. A medicinally acceptable acid addition salt of 7-chloro-2-methylamino-5-phenyl-3H-1,4-benzodiazepine 4-oxide can be used, if desired. Since, however, 3,3-diethyl-5-methyl-2,4-piperidinedione is somewhat unstable in an acid environment, when that compound is used in admixture with an acid addition salt of 7-chloro-2-methylamino-5-phenyl-3H-1,4-benzodiazepine 4-oxide, there should be present also a sufficient quantity of alkali, for example, an alkaline filler, such as coprecipitated aluminum hydroxide-calcium carbonate, to render the finished product basic, or at least neutral, in reaction. In general, any one of many medicinally acceptable acid addition salts of 7-chloro-2-methylamino-5-phenyl-3H-1,4-benzodiazepine 4-oxide can be used in the practice of this invention. These include salts of 7 - chloro-2-methylamino-5-phenyl-3H-1,4-benzodiazepine 4-oxide with conventional mineral acids, such as hydrochloric acid, hydrobromic acid, nitric acid, phosphoric acid; and with conventional organic acids, such as benzoic acid, toluene sulfonic acid, acetic acid, citric acid, maleic acid, tartaric acid, lactic acid, etc. In producing the preferred products of the invention, however, 7-chloro-2-methylamino-5-phenyl-3H-1,4-benzodiazepine 4 - oxide, or the hydrochloric acid salt thereof, is used.

The compositions of this invention are prepared simply by intimately mixing the two active components. The mixture is then embodied into a suitable dosage form. Suitable dosage forms include capsules, pressed or coated tablets, syrups, oily suspensions, etc. The methods by which such dosage forms are obtained are well known in the art.

In addition to the active ingredients, the compositions of this invention may contain the various adjuvants conventionally used in the formulation of pharmaceutical preparation. Exemplary of the adjuvants that may be employed in producing the compositions in encapsulated or tablet form are fillers, such as coprecipitated aluminum hydroxide-calcium carbonate, dicalcium phosphate or lactose in the presence of disintegrating agents, such as maize starch; and lubricating agents, such as talc, calcium stearate, etc. The compositions may, moreover, be produced in the form of suspensions in oil, for example, in a vegetable oil, such as arachis oil. Such suspensions may contain sweetening agents and preservatives of the type normally employed in the art.

The ratio of the active components comprising the products of this invention can be varied within rather wide limits. For example, the products may contain from about 4 to about 120 parts by weight of 3,3-diethyl-5-methyl-2,4-piperidinedione for each part by weight of 7-chloro-2-methylamino-5-phenyl-3H-1,4-benzodiazepine 4-oxide or for each part by weight of a salt thereof. The preferred products of the invention, however, contain from about 15 parts by weight to about 25 parts by weight of 3,3-diethyl-5-methyl-2,4-piperidinedione for each part by weight of 7-chloro-2-methylamino-5-phenyl-3H-1,4-benzodiazepine 4-oxide, or salt thereof.

A typical adult dosage of the active ingredients comprising the present compositions may vary within the range of from about 175 mg. to 225 mg. of 3,3-diethyl-5-methyl-2,4-piperidinedione with from about 8 mg. to about 12 mg. of 7-chloro-2-methylamino-5-phenyl-3H-1,4-benzodiazepine 4-oxide, or salt thereof. For example, a hard-shell capsule containing 200 mg. of 3,3-diethyl-5-methyl-2,4-piperidinedione and 10 mg. of 7-chloro-2-methylamino-5-phenyl-3H-1,4-benzodiazepine 4-oxide, or salt thereof, may be administered to the patient at bedtime. In cases of severe insomnia, a second capsule may be prescribed. Smaller doses may, of course, be recommended in particular cases, for example, in the treatment of children and debilitated patients. It should be fully understood, however, that the dosages set forth herein are exemplary only and that they do not, to any extent, limit the scope of this invention.

For a fuller understanding of the nature and objects of this invention, reference may be had to the following examples which are given merely as illustrative of the invention and are not to be construed in a limiting sense.

*Example 1*

The following ingredients, in the quantities indicated, were intimately mixed in a suitable container.

| | Grams |
|---|---|
| 7-chloro-2-methylamino-5-phenyl-3H-1,4-benzodiazepine 4-oxide | 1,020 |
| 3,3-diethyl-5-methyl-2,4-piperidinedione | 20,400 |
| Coprecipitated aluminum hydroxide-calcium carbonate | 400 |
| Starch | 5,400 |
| Talc | 1,500 |
| Lactose | 1,280 |

The mixture was then passed through a Fitzpatrick comminuting machine, following which the milled powder was mixed and re-blended. The powdery mixture was then passed into hard-shell capsules.

Example 2

In this example, 200 parts by weight of 3,3-diethyl-5-methyl-2,4-piperidinedione and 20 parts by weight of 7-chloro-2-methylamino-5-phenyl-3H-1,4-benzodiazepine 4-oxide were first intimately admixed. To this mixture, 65.0 parts by weight of coprecipitated aluminum hydroxide-calcium carbonate were added. This mixture was granulated with a mixture of 5 parts by weight of gelatin and 5 parts by weight of cornstarch.

Thereafter, the granulate, thus obtained, was mixed with 3.6 parts by weight of cornstarch, 4.0 parts by weight of talc and 0.4 parts by weight of magnesium stearate.

The product was then compressed into tablets by conventional means.

We claim:

1. A therapeutic composition comprising 3,3-diethyl-5-methyl-2,4-piperidinedione and a compound selected from the group consisting of 7-chloro-2-methylamino-5-phenyl-3H-1,4-benzodiazepine 4-oxide and a medicinally acceptable acid addition salt thereof, there being present in said composition, for each part by weight of said 1,4-benzodiazepine-4-oxide component, from about 4 to about 120 parts by weight of said 2,4-piperidinedione component.

2. The composition of claim 1 which contains pharmaceutical adjuvant material.

3. A therapeutic composition for internal administration in unit dosage form comprising a mixture of 3,3-diethyl-5-methyl-2,4-piperidinedione and a compound selected from the group consisting of 7-chloro-2-methylamino-5-phenyl-3H-1,4-benzodiazepine 4-oxide and a medicinally acceptable acid addition salt thereof with a pharmaceutical adjuvant, there being present in said composition, for each part by weight of said 1,4-benzodiazepine-4-oxide component, from about 4 to about 120 parts by weight of said 2,4-piperidinedione component.

4. A therapeutic composition for internal administration in shaped unit dosage form for oral administration comprising a mixture of 3,3-diethyl-5-methyl-2,4-piperidinedione and 7-chloro-2-methylamino-5-phenyl-3H-1,4-benzodiazepine 4-oxide with a solid pharmaceutical adjuvant, there being present in said composition, for each part by weight of said 1,4-benzodiazepine-4-oxide component, from about 4 to about 120 parts by weight of said 2,4-piperidinedione component.

5. A therapeutic composition for internal administration in shaped unit dosage form for oral administration comprising a mixture of 3,3-diethyl-5-methyl-2,4-piperidinedione and a medicinally acceptable acid addition salt of 7-chloro-2-methylamino-5-phenyl-3H-1,4-benzodiazepine 4-oxide with a solid pharmaceutical adjuvant, there being present in said composition, for each part by weight of said 1,4-benzodiazepine-4-oxide component, from about 4 to about 120 parts by weight of said 2,4-piperidinedione component.

6. The composition of claim 5 wherein the hydrochloride salt of 7-chloro-2-methylamino-5-phenyl-3H-1,4-benzodiazepine 4-oxide is employed.

7. A process for treating insomnia which comprises internally administering a therapeutic composition comprising from about 175 mg. to about 225 mg. of 3,3-diethyl-5-methyl-2,4-piperidinedione and from about 8 mg. to about 12 mg. of a compound selected from the group consisting of 7-chloro-2-methylamino-5-phenyl-3H-1,4-benzodiazepine 4-oxide and a medicinally acceptable acid addition salt thereof.

References Cited in the file of this patent

Physicians' Desk Reference, page 798 (Hyptran), page 710 (Noludar), January 1961.

The New England J. of Med., Apr. 27, 1961, pages 870–873, vol. 264, No. 17.